United States Patent [19]

Wojsznis

[11] Patent Number: 5,568,378
[45] Date of Patent: Oct. 22, 1996

[54] VARIABLE HORIZON PREDICTOR FOR CONTROLLING DEAD TIME DOMINANT PROCESSES, MULTIVARIABLE INTERACTIVE PROCESSES, AND PROCESSES WITH TIME VARIANT DYNAMICS

[75] Inventor: Wilhelm K. Wojsznis, Round Rock, Tex.

[73] Assignee: Fisher-Rosemount Systems, Inc., Austin, Tex.

[21] Appl. No.: 328,323

[22] Filed: Oct. 24, 1994

[51] Int. Cl.$^6$ .......................... G05B 13/02; G05B 13/04
[52] U.S. Cl. .......................... 364/164; 364/165; 364/150; 364/177
[58] Field of Search .................................. 364/158, 164, 364/165, 149, 150, 151, 176, 177

[56] References Cited

U.S. PATENT DOCUMENTS

| 5,347,446 | 9/1994 | Iino et al. | 364/149 |
|---|---|---|---|
| 5,351,184 | 9/1994 | Lu et al. | 364/165 |
| 5,424,942 | 6/1995 | Dong et al. | 364/164 |

OTHER PUBLICATIONS

*Advances in Instrumentation and Control*, vol. 49, No. Part 03, Oct. 23, 1994, pp. 767–774, XP 000508987 Wojsznis W. K. et al. "Predictive Control Implementation into DCS Controller".

*ISA Transactions*, vol. 32, No. 4, Dec. 1993 Amsterdam NL, pp. 339–344, Wojsznis W. K. et al. "Robust Predictive Controller in Object–Oriented Implementation".

*Proceedings of the 1986 American Control Conference*, vol. 1, 18–20 Jun. 1986 Seattle US, pp. 344–348. V. P. Quigley et al. "Adaptive Horizon Adjustment for Model–Predictive Control".

*Second IEEE International Conference on Fuzzy Systems*, vol. II, Mar. 28, 1993–Apr. 1, 1993; pp. 1091–1098, C. Georgescu et al., "Fuzzy Predictive PID Controllers a Heating Control Application".

Computer Process Control, 2nd Edition, P. Deshpande and R. Ash, pp. 177–228, *11.4 Smith Predictor Algorithm*.

*Primary Examiner*—Paul P. Gordon
*Attorney, Agent, or Firm*—Kinney & Lange, P.A.

[57] ABSTRACT

A Variable Horizon Predictor (VHP) compensates for dead time, measured disturbances, and time variant dynamics in process control loops. The VHP is comprised of a process model, an uncorrected prediction vector unit, a prediction correction unit, a corrected prediction vector unit, and a horizon selection unit 54. The VHP applies a controller output signal to the process model to form a prediction vector that is stored in the uncorrected prediction vector unit and predicts the process output signal over a prediction horizon. The prediction is corrected by the prediction correction unit, which compares the prediction vector to the process output signal. The corrected prediction vector is then stored in the corrected prediction vector unit. The horizon selection unit isolates a portion of the prediction vector to form a subvector and feeds the subvector to an error vector calculator to form an error signal that is applied to the controller. A multivariable interactive control system is implemented by coupling plurality of VHPs and a plurality of loop interaction compensators to a process having a plurality of control inputs and a plurality of control outputs.

28 Claims, 5 Drawing Sheets

VARIABLE HORIZON PREDICTOR FOR CONTROLLING DEAD TIME DOMINANT PROCESSES, MULTIVARIABLE INTERACTIVE PROCESSES, AND PROCESSES WITH TIME VARIANT DYNAMICS

BACKGROUND OF THE INVENTION

The present invention is a Variable Horizon Predictor that provides a prediction of a controlled process output. More specifically, the Variable Horizon Predictor of the present invention provides a classic feedback loop with properties of a predictive control loop, thereby compensating for dead time and time variant dynamics.

In the control art, traditional or classic feedback controllers dominate control practice. Traditional feedback controllers include linear controllers, such as the proportional (P) controller, the proportional-integral (PI) controller, or the proportional-integral-derivative (PID) controller, and nonlinear controllers, such as the fuzzy logic (FL) controller.

However, traditional feedback controllers do not perform well with processes dominated by dead time and processes having time-variant dynamics. In addition, traditional feedback controllers do not perform well with multivariable processes, where interactions exist between the process variables.

Several predictive control techniques have been developed to address the limitations of traditional feedback controllers, but none of these techniques has displaced the traditional feedback controller from its dominant position.

SUMMARY OF THE INVENTION

The present invention is a Variable Horizon Predictor (VHP) that may be used with any type of control algorithm, compensates for dead time and time variant dynamics in process control loops, and may be used with interactive multivariable processes. The VHP applies a controller output signal to a process model to form a prediction vector that predicts the process output signal over a prediction horizon. The prediction is corrected by comparing the prediction vector to the process output signal. A horizon selector isolates a prediction subvector of the prediction vector, which is fed back to an adder to form the error signal that is applied to the controller. The subvector may comprise between one element of the prediction vector and the entire prediction vector.

In a first mode of operation, the VHP of the present invention is configured to provide a prediction of the output of the controlled process at a future time based on the dead time of the process.

In a second mode of operation, the VHP of the present invention is configured to provide a prediction vector of the controlled process that includes a number of predictions at different times in the future. In this mode, an error vector is computed by subtracting the prediction vector from a set point prediction vector. If the controller expects a single error value, then the error vector can be converted into a weighted average to form an error scalar, and the error scalar can be applied to the controller.

Finally, both of these modes may be used in a multivariable control system, wherein the controlled process has multiple process inputs and multiple process outputs. In a multivariable control system, a VHP is provided for each process output, and a control loop is provided for each process input. The VHPs compensate for measured disturbances, dead time, time variant dynamics, and predicted errors in neighboring control loops.

DETAILED DESCRIPTION OF THE PREFERRED EMBODIMENTS

Figure 1:
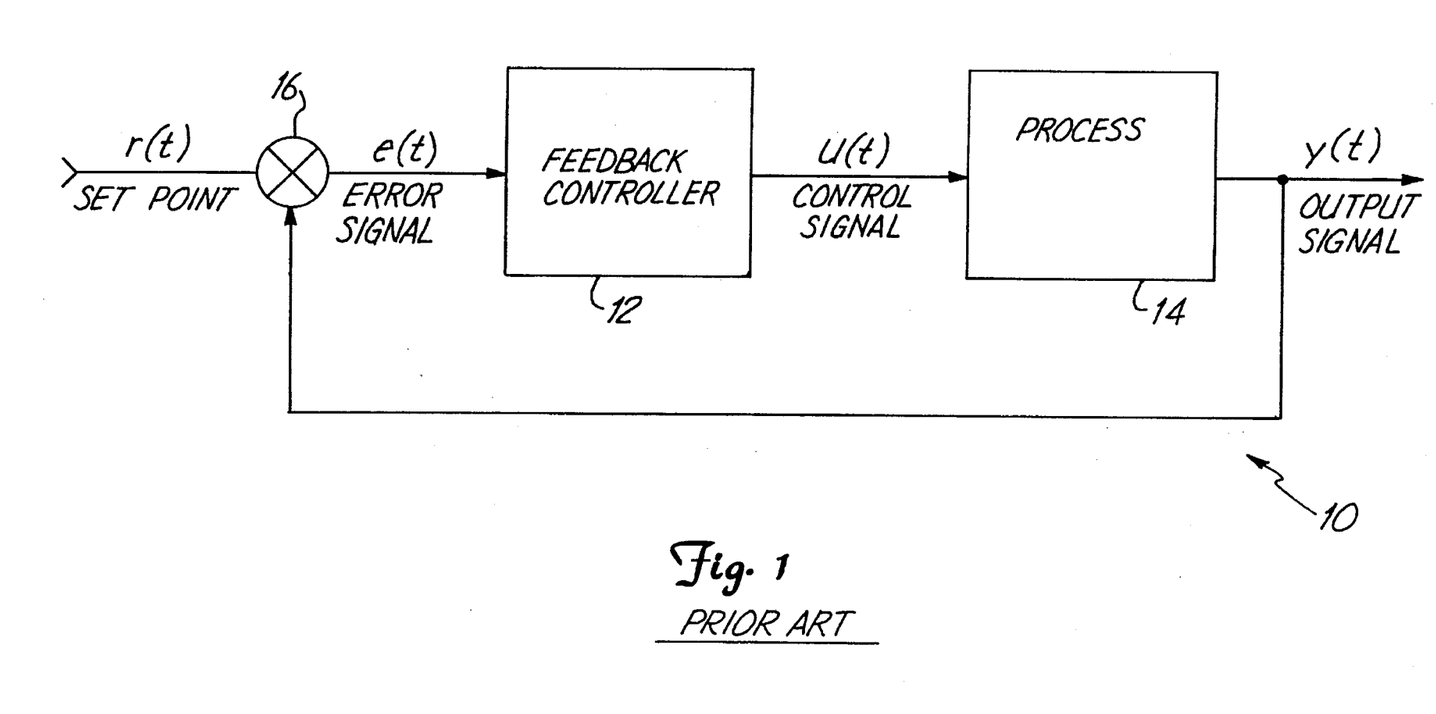
FIG. 1 is a block diagram of a prior art process control loop.

FIG. 1 is a block diagram of prior art process control loop 10. Loop 10 is comprised of traditional feedback controller 12, process under control 14, and adder 16. Feedback controller 12 represents any type of feedback controller known in the art, including linear controllers, such as the proportional (P) controller, the proportional-integral (PI) controller, and the proportional-integral-derivative (PID) controller, and nonlinear controllers, such as the fuzzy logic (FL) controller.

Feedback controller 12 receives an error signal e(t) from adder 16 and processes the error signal using control parameters to form the control signal u(t). Process 14 receives the control signal u(t) and exhibits some type of response that is evident in the output signal y(t). The output signal y(t) is fed back to adder 16, where it is subtracted from the set point signal r(t) to produce the error signal e(t), which represents the difference between the desired process output and the current process output.

Control loop 10 may represent the control of one of many different types of industrial processes. For example, assume process 14 comprises a mixing tank that must be maintained at a specified temperature. In this example, the output signal y(t) represents the measured temperature of the tank, the set point input r(t) represents the desired temperature of the tank, the error signal e(t) represents the difference between the set point temperature and the measured temperature and the control signal u(t) is used to control a device that applies heat to the tank.

Figure 2:
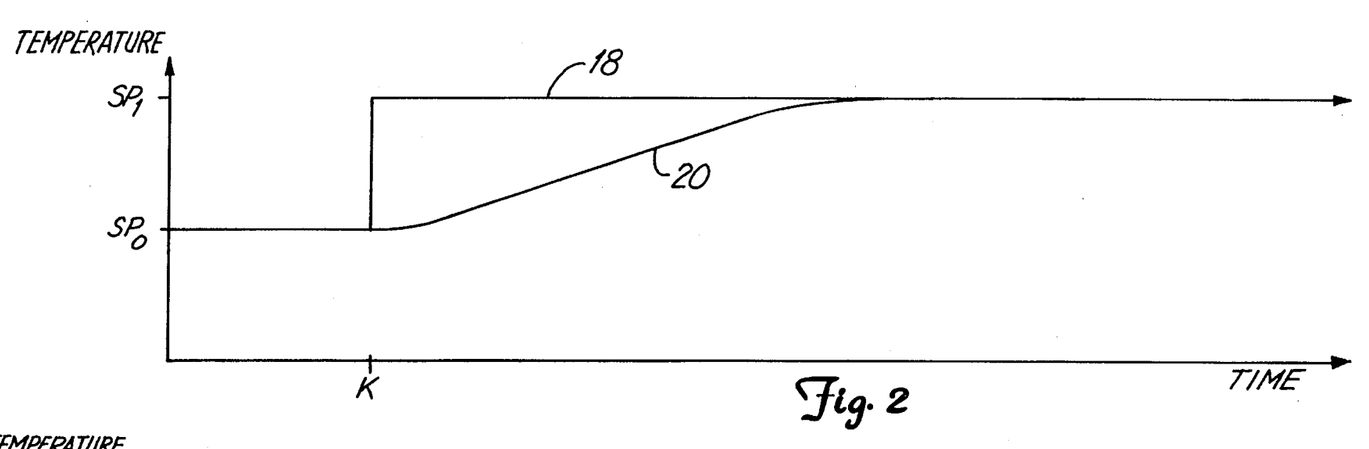
FIG. 2 shows a response of a process having minimal dead time.

Assume that in this example, the device that applies heat to the tank is an electric heating element that responds quickly to the control signal u(t). FIG. 2 shows the response of process 14 for a control loop having such a device, with curve 18 representing a change in the set point signal r(t) from $SP_0$ to $SP_1$ at time k, and curve 20 representing the response of process 14 at output signal y(t). Because the heating element responds quickly to the control signal u(t), curve 20 begins to move toward the new set point almost immediately after the set point change.

Figure 3:
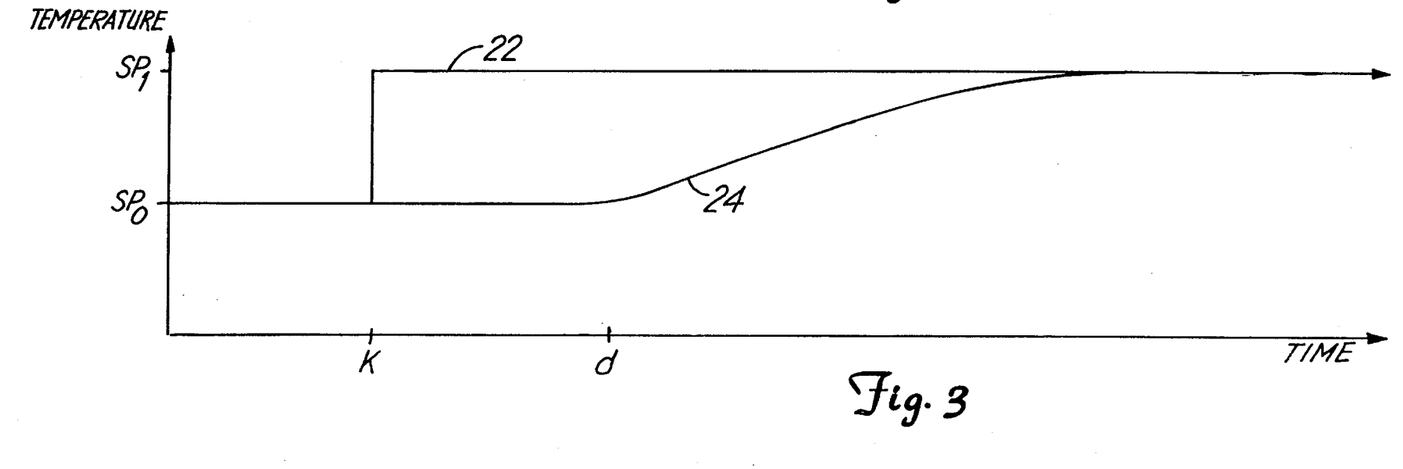
FIG. 3 shows a response of a process having substantial dead time.

Now assume that the device that applies heat to the tank is a boiler that generates steam, with a substantial length of pipe connecting a heat exchanger in the tank to the boiler, and a valve having a valve positioner controlled by the control signal u(t) controlling the flow of steam through the pipe. FIG. 3 shows the response of process 14 for a control loop having such a configuration, with curve 22 representing a change in the set point signal r(t) from $SP_0$ to $SP_1$ at time k, and curve 24 representing the response of process 14 at output signal y(t). Because the steam must travel the length of the pipe before reaching the heat exchanger, curve 20 does not begin to move toward the new set point until time d. Time d–k is known in the control art as "dead time", and refers to a delay between a control action contained in the signal u(t), and the beginning of a response to the control action in the signal y(t).

The dominant time constant of a process is defined as the time required for the output signal to reach about 63% of the steady-state output value of the output signal after application of a unit step signal to the process input, assuming that the process has no dead time. Feedback controllers perform well when dead time is relatively small compared to the dominant time constant of the process under control. However, the performance of feedback controllers deteriorates as dead time approaches the dominant time constant of the process.

A number of solutions have been developed to compensate for dead time. Typically, these solutions involve the use of a mathematical model of the process to remove dead time from the feedback signal, thereby improving the quality of process control. One of the most successful solutions to the problems caused by dead time is the Smith Predictor.

Figure 4:
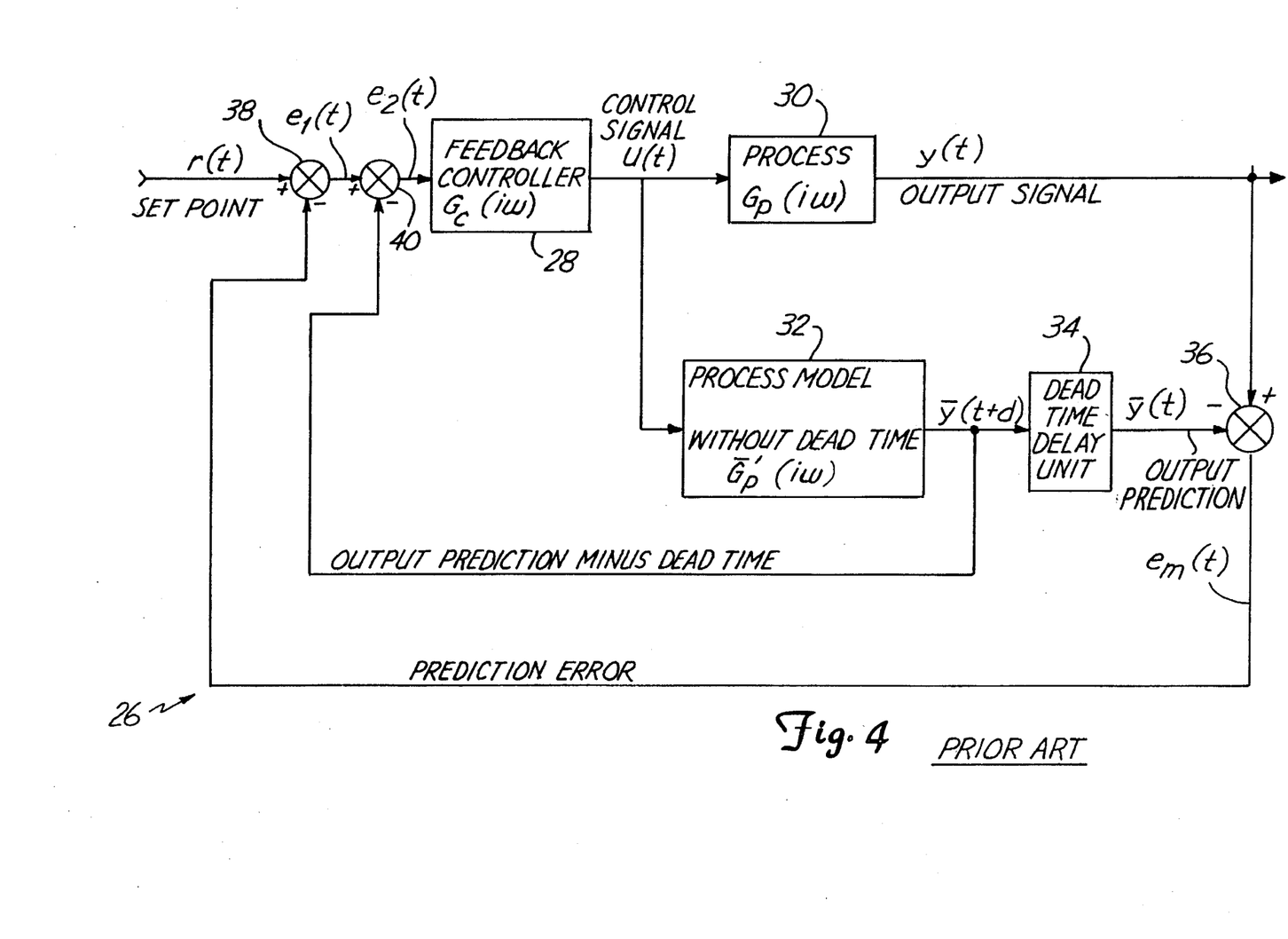
FIG. 4 is a block diagram of a prior art control loop having a Smith Predictor.

FIG. 4 is a block diagram of a prior art control loop 26 provided with a Smith Predictor. Loop 26 comprises feedback controller 28, process under control 30, process model (without dead time) 32, dead time delay unit 34, and adders 36, 38, and 40.

Feedback controller 28 receives an error signal $e_2(t)$ from adder 40 and processes the error signal using control parameters to form the control signal u(t). Process 30 receives the control signal u(t). As a consequence of the action of the control signal u(t), the process exhibits some type of response that is evident in the output signal y(t). Feedback controller 28 has a transfer function $G_C(i\omega)$, and process under control 30 has a transfer function $G_P(i\omega)$.

Together, process model 32 and dead time delay unit 34 form a model of process 30. Process model 32 has a transfer function $\overline{G}'_P(i\omega)$, which approximates the process transfer function $G_P(i\omega)$, but without dead time. As used herein, a variable label having a horizontal bar (e.g., $\overline{G}'_P(i\omega)$) represents a prediction of a physical signal, or a model that generates a prediction.

In a control loop having a Smith Predictor, the controlled process is modeled as a first order function plus dead time. Therefore, the transfer function $\overline{G}'_P(i\omega)$ is equal to the first order function component of $G_P(i\omega)$. In FIG. 4, process model 32 also receives control signal u(t). Accordingly, process model 32 produces signal $\overline{y}(t+d)$, which is a prediction of the value of signal y(t) at a time in the future equal to the dead time. The signal $\overline{y}(t+d)$ is fed back to adder 40, where it is subtracted from the error signal $e_1(t)$ to form the error signal $e_2(t)$, which is supplied to feedback controller 28.

The signal $\overline{y}(t+d)$ is also provided to dead time delay unit 34, which delays the signal $\overline{y}(t+d)$ by a time interval equal to the dead time to produce output prediction $\overline{y}(t)$. The predicted output signal $\overline{y}(t)$ is subtracted from the actual output signal y(t) by adder 36 to form the signal $e_M(t)$, which represents the modeling error. The signal $e_M(t)$ is subtracted from the set point signal r(t) at adder 38 to form the error signal $e_1(t)$.

If process model 32 and dead time delay unit 34, taken together, form a perfect model of process 30, then the model error signal $e_M(t)$ will be zero and feedback controller 28 will receive an error signal equal to the set point signal minus the prediction. However, in practice the model will never be perfect and the model error signal $e_M(t)$ will be non-zero. Accordingly, the Smith Predictor eliminates the effects of dead time to the extent that the model matches the process, but includes dead time when compensating for the effect of model error.

The Smith Predictor works well for processes that have a constant dead time and dynamics that are accurately modeled by a first order approximation. However, the Smith Predictor is sensitive to process model mismatch. This is a significant problem because many industrial processes have complicated dynamics that are not closely approximated by a first order plus dead time model. In addition, the Smith Predictor has difficultly coping with load disturbances and is not designed to operate with processes having multiple inputs and outputs.

Many other techniques have been developed to operate with dead time dominant processes, interactive processes, and processes with time variant dynamics. These techniques include Model Algorithmic Control (also known as Identification and Command) disclosed by J. P. Richalet, A. Rault, J. L. Testud, and J. Papon in "Model Predictive Heuristic Control: Applications to Industrial Processes," *Automatica*, Vol. 14, 1978, and Dynamic Matrix Control disclosed by C. R. Cutler and B. L. Ramaker in "Dynamic Matrix Control—A Computer Control Algorithm," *The National Meeting of the American Institute of Chemical Engineers*, Houston, Tex., April 1979. These techniques are generally referred to as Model Predictive Control (MPC), and require that an engineer develop an accurate mathematical model of the process under control. MPC techniques successfully address many of the limitations of the Smith Predictor and traditional feedback controllers. However, implementing MPC techniques requires sophisticated tools and a high level of engineering knowledge and skill. MPC techniques have had a growing impact on the control industry. However, classic linear feedback controllers, such as the proportional (P) controller, the proportional-integral (PI) controller, and the proportional-integral-derivative (PID) controller, and nonlinear feedback controllers, such as the fuzzy logic (FL) controller, continue to dominate control practice.

Other techniques that operate with dead time dominant processes, interactive processes, and processes with time variant dynamics employ model-based algorithms. These techniques include the Analytical Predictor Algorithm disclosed by C. F. Moore in "Selected Problems in the Design and Implementation of Direct Digital Control," *Ph.D. Thesis*, Department of Chemical Engineering, Louisiana State University, 1969, Simplified Model Predictive Control, Disclosed by G. R. Arulalan and P. B. Deshpande in "Simplified Model Predictive Control," *I & E C Proc. Des. Dev.* 25, 2, 1987, and the Q-PID controller disclosed by Pradeep B. Deshpande, Russel E. Hannula, Mohan A. Bhalodia, and Clay W. Hansen in "Achieve Total Quality Control of Continuous Processes," *Chemical Engineering Progress*, July 1993. These techniques require accurate mathematical models of the controlled processes, and the controller tuning process is cumbersome. Therefore these techniques have not met with wide practical acceptance, although they have had a substantial academic impact.

Accordingly, there is a need in the control industry for a control strategy that compensates for dead time, can operate effectively with a process having complex and time variant dynamics, does not require an exact mathematical model of the process under control, can compensate for load disturbances, and operate effectively with multivariable processes.

The Variable Horizon Predictor (VHP) of the present invention fulfills these needs by combining the model based prediction abilities of MPC techniques with any control algorithm. Therefore, the VHP of the present invention can be configured as an add-on unit that can be coupled into a control loop having a traditional feedback controller.

Figure 5:
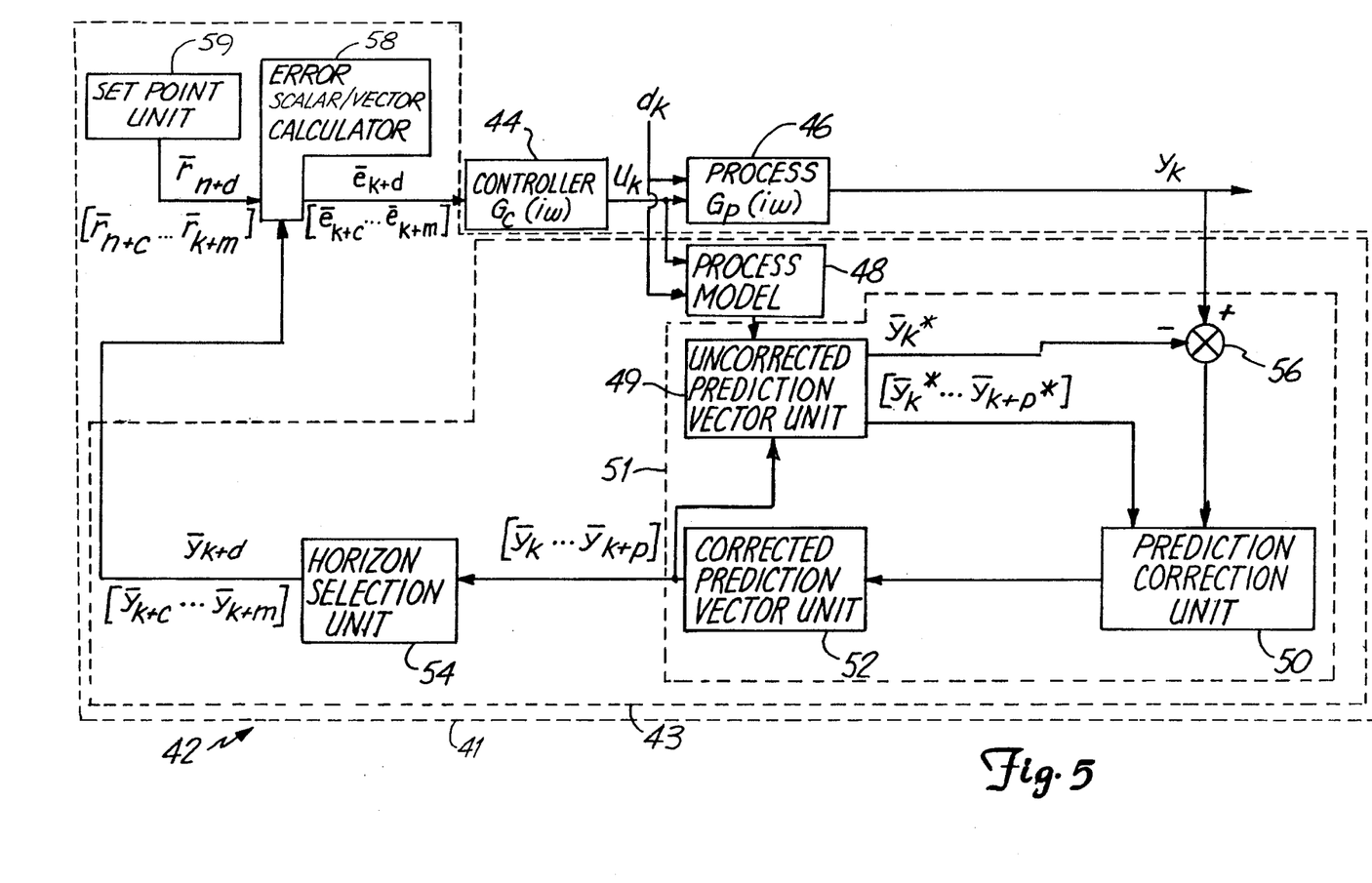
FIG. 5 is a block diagram showing a control loop having the Variable Horizon Predictor of the present invention.

FIG. 5 is a block diagram showing a control loop 42 provided with a VHP 41 of the present invention. Control loop 42 comprises VHP 41, controller 44, and controlled process 46. VHP 41 comprises error scalar/vector calculator 58, set point unit 59, and VHP prediction unit 43. VHP prediction unit 43 comprises process model 48, prediction vector unit 51, and horizon selection unit 54. Finally, prediction vector unit 51 comprises uncorrected prediction vector unit 49, prediction correction unit 50, corrected prediction vector unit 52, and adder 56. The signals shown in FIG. 5 are depicted as discrete signals, compared to the continuous signals shown in the previous figures. Those skilled in the art will recognize that discrete signals can be converted to continuous signals, and continuous signals can be converted to discrete signals using techniques known in the art.

Typically, digital control loops control the process by operating synchronously at time slots known as "scans" that are separated by "scan intervals." During each scan, the signals at various locations of the control loop are sampled, and a control action is taken based on the samples.

In FIG. 5, the subscript k refers to the state of control loop 42 at scan k. Accordingly, the signal $y_k$ represents the current output of process 46 (as measured during the last scan). Before the prediction is updated, the signal $\bar{y}_k$ represents a prediction of the output of process 46 at scan k−1. After the prediction is updated, the signal $\bar{y}_k$ represents a prediction of what the output of process 46 will be at the next scan. The subscript p represents the outer edge of the prediction horizon, which will be described in greater detail below.

Process 46 receives a control signal $u_k$ from controller 44. Process 46 is also shown receiving disturbance signal $d_k$, which represents a measurable disturbance. The signals $u_k$ and $d_k$ cause process 46 to exhibit a response in the process output signal $y_k$.

The signals $u_k$ and $d_k$ are also provided to process model 48, which contains step responses of the process to the signals $u_k$ and $d_k$. Uncorrected prediction vector unit 49 forms an uncorrected prediction vector $[\bar{y}_k^* \ldots \bar{y}_{k+p}^*]$ that contains predicted values of the process output signal for every future scan from time k out to the edge of the prediction horizon, which is time k+p. Adder 56 compares the actual output of process 46 ($y_k$) with the predicted output ($\bar{y}_k^*$) and generates a prediction error. Prediction correction unit 50 adjusts every element of the uncorrected prediction vector based on the prediction error to form the corrected prediction vector $[\bar{y}_k \ldots \bar{y}_{k+p}]$, which is stored in corrected prediction vector unit 52.

Horizon selection unit 54 selects a prediction subvector $[\bar{y}_{k+c} \ldots \bar{y}_{k+m}]$ of prediction vector $[\bar{y}_k \ldots \bar{y}_{k+p}]$, which is then applied to error scalar/vector calculator 58. In the simplest mode of operation of the present invention, the selected prediction subvector will be a single predicted value based on the process dead time. This is represented in FIG. 5 by the signal $\bar{y}_{k+d}$. In another mode of operation, the selected prediction subvector can comprise the entire prediction vector or a subset of the prediction vector. This is represented in FIG. 5 by the signal $[\bar{y}_{k+c} \ldots \bar{y}_{k+m}]$, where $0 \leq m \leq p$.

The prediction selected by horizon selection unit 54 is provided to error scalar/vector calculator 58. Set point unit 59 must provide calculator 58 with a set point prediction vector having the same number of elements as the prediction subvector. This vector may be generated by simply assuming that the future set point will be the current set point such that $\bar{r}_k = \bar{r}_{k+1} = \bar{r}_{k+2} = \ldots = r_k$. Alternatively, the set point prediction vector may be shaped arbitrarily. For example, a control room operator may program a computer to raise a process set point slowly over a period of hours, in which case, the computer (represented by set point unit 59) can provide a set point prediction vector to error scalar/vector calculator 58 that reflects the anticipated change in the process set point. Alternatively, the set point signal $r_k$ may applied to a first order plus dead time filter to form a set point reference trajectory prediction vector such that a step change in the process set point from $SP_0$ to $SP_1$ results in a set point reference trajectory prediction vector that predicts a smooth change in the set point signal from $SP_0$ to $SP_1$ between scan k and scan k+p.

Error scalar/vector calculator 58 subtracts the prediction subvector from the set point prediction vector to form the error signal that is provided to controller 44. For a single prediction point based on dead time, $\bar{e}_{k+d}$ is equal to $\bar{r}_{k+d}$ minus $\bar{y}_{k+d}$. For a plurality of prediction points, the error vector $[\bar{e}_{k+c} \ldots \bar{e}_{k+m}]$ is equal to $[\bar{r}_{k+c} \ldots \bar{r}_{k+m}]$ minus $[\bar{y}_{k+c} \ldots \bar{y}_{k+m}]$, where $0 \leq c < m \leq p$.

Depending on the controller, the controller may receive the whole error vector, or a weighted average of the error vector may be formed and applied to the controller, as will be discussed in greater detail below.

In one embodiment of the present invention, the prediction algorithm employed is that disclosed by Manfred Morari, N. L. Richer, and Evanghelos Zafiriou in a handout entitled "Model Predictive Control" distributed at Workshop Number 4 of the American Control Conference, which was held in Chicago, Ill. in June of 1992. In this algorithm, the dynamics of the process are modeled by the response measured at the process output for a unit step signal applied to the process input and a unit step signal applied to the disturbance input. For the process input, the step response coefficients are assembled into a p×1 matrix as follows:

$A = [a_1, a_2, \ldots a_p]^T$.

For the disturbance input, the step response coefficients are assembled into a p×1 matrix as follows:

$D = [d_1, d_2, \ldots d_p]^T$.

Additional measured disturbances may be included in the prediction, if required. The superscript "T" denotes a transposed matrix and the individual coefficients represent measurements of the output signal taken at intervals separated by the loop scan interval, with the first measurement taken at the first scan after the application of the unit step signal and the pth measurement taken at the scan corresponding to the outer limit of the desired prediction horizon. If an analytical process model is available, the coefficients may be calculated. The coefficients are stored in process model 48.

When the variable horizon predictor of the present invention is initiated, the prediction vector $\bar{Y}_0$ is initiated by setting all predictions contained in the vector to the current state of the process output signal. In other words:

$$\bar{Y}_0 = [\bar{y}_0 \ldots \bar{y}_{p-1}]^T = [y_0 \ldots y_0]^T.$$

After every loop scan, the prediction vector is updated by shifting the vector one step into the future, and adjusting the vector to take into account the controller action that occurred in the last loop scan and disturbances measured in the last scan. In matrix notation, this is represented as follows:

$$\bar{Y}_k^* = M\bar{Y}_{k-1} + A\delta u_{k-1} + D\delta d_{k-1}$$

where $$\delta u_{k-1} = u_{k-1} - u_{k-2}$$

and is the change in the control input of the process at scan k−1, $$\delta d_{k-1} = k_{k-1} - k_{k-2}$$

and is the observed change in the disturbance input at scan k−1, and M is a p×p matrix that shifts the prediction vector into the future and copies $\bar{y}_{k-1}$ into the vector position of $\bar{y}_k$. For example for p=5, the matrix M is:

$$\begin{vmatrix} 0 & 1 & 0 & 0 & 0 \\ 0 & 0 & 1 & 0 & 0 \\ 0 & 0 & 0 & 1 & 0 \\ 0 & 0 & 0 & 0 & 1 \\ 0 & 0 & 0 & 0 & 1 \end{vmatrix}$$

If the measured variable of the process represents an integrating action, then the last two digits of the last row of the matrix should be |... −1 2|, instead of |... 0 1|. After the prediction vector has been updated, it is stored in uncorrected prediction vector unit 49.

Next, the prediction vector is corrected by prediction correction unit 50 to compensate for modeling errors and unmeasured (or unmeasurable) disturbances. The correction is performed by simply adding a quantity based on the difference $(y_k - \bar{y}_k)$ to each element of the prediction vector as follows:

$$\bar{Y}_k = \bar{Y}_k^* + F(y_R - \bar{y}_R)$$

where $y_k$ is the observed process output at scan k and $\bar{y}_k$ is the prediction of the process output at scan k. Typically, F is p×1 unity vector. However, F may also be a filter (such as a first order low-pass filter or other types of filters known in the art) to prevent the prediction correction from changing too much from scan to scan. After the vector is corrected by prediction correction unit 50, it is stored in corrected prediction vector unit 52. Horizon selection unit 54 selects the prediction subvector from the prediction vector between times k and k+p and provides the prediction subvector to error scalar/vector calculator 58.

When using the VHP of the present invention in its simplest mode of operation, horizon selection unit 54 will be configured to provide a single prediction point in the future related to the dead time of process 46. It has been found that selection of a prediction a little farther in the future than the dead time provides sensitive control of the process, while selection of a prediction significantly farther in the future than dead time, and close to where the process step response reaches steady state, provides very stable and robust control of the process.

In another mode of operation, the prediction subvector [$\bar{y}_{k+c} \ldots \bar{y}_{k+m}$] is used. If the VHP of the present invention is being configured to being operated with a classic feedback controller, then the controller will most likely expect a single error signal at the controller input. Therefore, the error vector [$\bar{e}_{k+c} \ldots \bar{e}_{k+m}$] must be formed into an error scalar. The error scalar can be formed by computing a weighted average as follows:

$$e_k = \alpha_{k+c}\bar{e}_{k+c} + \alpha_{k+c+1}\bar{e}_{k+c+1} + \ldots + \alpha_{k+m}\bar{e}_{k+m},$$

where $$\alpha_{k+c} + \alpha_{k+c+1} + \ldots + \alpha_{k+m} = 1.$$

The values of α determine to what extent predicted error elements of the subvector are represented in the error scalar. The effect of computing a scalar error from a weighted average of the error vector, and applying the scalar error to a classic feedback controller is to convert a classic feedback control loop into a predictive control loop that calculates control moves based on a series of predicted values, thereby eliminating dead time and provide more robust control of the process.

In addition, if a process has a time-varying dead time that can be measured, the measured dead time can be provided to the horizon selection unit, which in turn will select the proper prediction based on the measured dead time. For example, in the example discussed above, where dead time was caused by steam flowing through a pipe, assume that the steam is alternately provided by one of two boilers, with each boiler coupled to the process by a different length of pipe. In this example, horizon selection unit 54 would be configured to select the prediction based on the boiler that was coupled to the process.

It is contemplated that the VHP of the present invention will typically be used with a traditional feedback controller, such as a P, PI, PID, or FL controller. In such a configuration, the feedback controller tuned to provide integral control action (with minimal proportional control action and no derivative control) and coupled to the VHP of the present invention implements a simplified predictive algorithm. This assertion is justified by considering that the least squares solution of the model predictive control technique disclosed by Morari et al. results in a control move vector $\delta\bar{u}_k$ as follows:

$$\delta\bar{u}_k = (S^T\Gamma^{yT}\Gamma^yS + \Gamma^{uT}\Gamma^u)^{-1} S^T\Gamma^{yT}\Gamma^y\bar{E}_k,$$

where $\Gamma^y$ is a penalty matrix on the output error such that:

$$\Gamma^y = \text{diag}\ [\Gamma^y{}_1, \ldots, \Gamma^y{}_p],$$

$\Gamma^u$ is a penalty matrix on control moves such that:

$$\Gamma^u = \text{diag}\ [\Gamma^u{}_1, \ldots, \Gamma^u{}_m],$$

m is the number of control moves calculated in the future (with the penalty matrix having a scalar value of $\Gamma^u$ for "one move ahead" control), S is a p×m process dynamic matrix (which is equal to the step response vector A discussed above for "one move ahead" control), $\bar{E}_k$ is an error control vector over the prediction horizon such that:

$$\bar{E}_k = [e_k, \ldots, e_{k+p}]^T,$$

and the superscript "T" denotes a transposed matrix.

When used to calculate "one move ahead" control moves (e.g., m=1), the denominator of the equation for $\delta u_k$ becomes a scalar equal to $A^T\Gamma^{yT}\Gamma^yA + \Gamma^{uT}\Gamma^u$ and the numerator becomes $A^T\Gamma^{yT}\Gamma^u\bar{E}_k$. It can easily be seen that a "one move ahead" predictive control algorithm provides weighted integral control over the entire prediction horizon. Every predicted error for every future loop scan is accounted for in every calculated control move, with an adequate penalty on each error prediction multiplied times the appropriate step response coefficient.

The equation that defines the control move $\delta u_k$ can be further simplified by defining based on a single point in the future as follows:

$$\delta u_k = (a_i \Gamma^y{}_i^2 e_{k+i})/(a_i^2 \Gamma^y{}_i^2 + \Gamma^u{}_i^2),$$

which can be simplified to:

$$\delta u_k = K_i e_{k+i},$$

where $$K_i = a_i/(a_i^2 + (\Gamma^u{}_i/\Gamma^y{}_i)^2).$$

Accordingly, $K_i$ is a predictive controller gain for control that is based on a predicted process error at a time instant at k+i in the future. To implement this control algorithm using a classic feedback controller that has been coupled to the VHP of the present invention, the feedback controller gain is set to $K_i$ and horizon selection unit 54 is set to select a prediction at scan k+i.

In another embodiment of the present invention, a pair of VHPs are used in a process control loop having a process with two inputs and two outputs and controlled by a pair of classic feedback controllers, with each such feedback controller having a single error input and a single control output. A process having two inputs and two outputs is known in the art as a 2×2 process.

One predictive multivariable strategy known in the art defines controller moves for a 2×2 process as follows:

$$\begin{vmatrix} \delta u_1 \\ \delta u_2 \end{vmatrix} = \begin{vmatrix} K_{11} & K_{12} \\ K_{21} & K_{22} \end{vmatrix} \begin{vmatrix} \bar{e}1_{k+i} \\ \bar{e}2_{k+j} \end{vmatrix},$$

where $\delta u_1$ is the change in the control signal supplied to the first input of the process, $\delta u_2$ is the change in the control signal supplied to the second input of the process, $\bar{e}1_{k+i}$ is the predicted process error of the first process output at scan k+i, $\bar{e}2_{k+j}$ is the predicted process error of the second process output at scan k+j, $K_{11}$ is the gain of the first controller output with respect to the first predicted process error, $K_{12}$ is the gain of the first controller output with respect to the second predicted process error, $K_{21}$ is the gain of the second controller output with respect to the first predicted process error, $K_{22}$ is the gain of the second controller output with respect to the second predicted process error.

Based on the above matrix, the individual control actions are as follows:

$$\delta u_1 = K_{11}\bar{e}1_{k+i} + K_{12}\bar{e}2_{k+j},$$

and $$\delta u_2 = K_{21}\bar{e}1_{k+i} + K_{22}\bar{e}2_{k+j},$$

In these equations, each controller action is based on two inputs, $\bar{e}1_{k+i}$ and $\bar{e}2_{k+j}$, and each input must be multiplied by a separate gain. However, classic feedback controllers typically have only one input.

In accordance with the present invention, two classic feedback controllers coupled with two VHP prediction units and two loop interaction compensators implement the 2×2 control algorithm described above. By rearranging the right side of each of the above equations, it can be seen that:

$$\delta u_1 = K_{11}(\bar{e}1_{k+i} + (K_{12}/K_{11})\text{fheight}\bar{e}2_{k+j}),$$

and $$\delta u_2 = K_{22}((K_{21}/K_{22})\text{fheight}\bar{e}1_{k+i} + \bar{e}2_{k+j}).$$

Accordingly, the first classic feedback controller is configured to have a gain $K_{11}$ and the second classic feedback controller is configured to have a gain $K_{22}$, with each feedback controller receiving an error signal based on the predicted error in the neighboring loop multiplied times a scaling factor plus the predicted error in the feedback controller's own loop.

Figure 6:
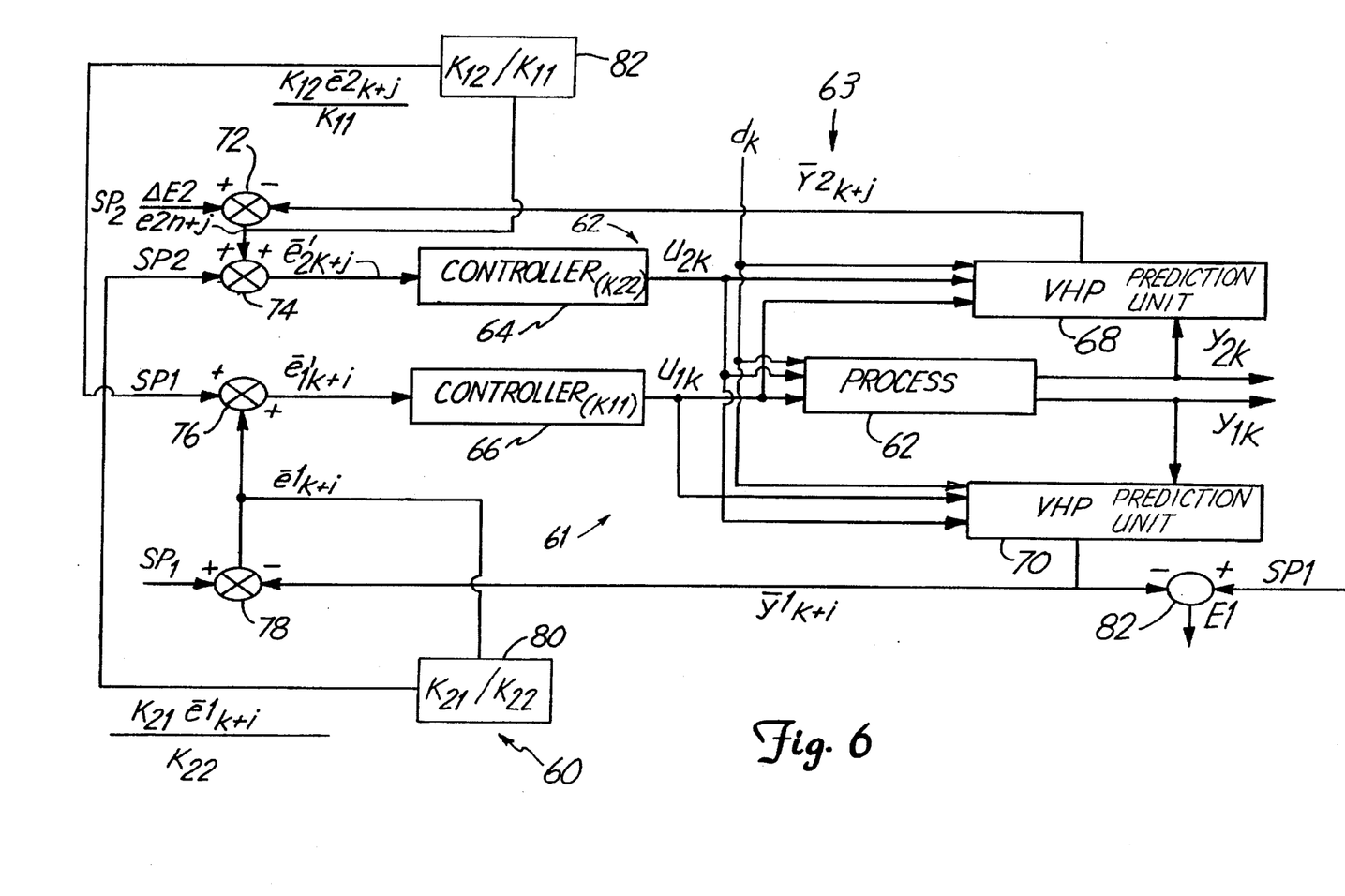
FIG. 6 is a block diagram of a control loop having a process under control that has two control inputs and two process outputs.

FIG. 6 is a block diagram of a control system 60 having control loops 61 and 63 and 2×2 process 62. Control loop 63 comprises process 62, controller 64, VHP prediction unit 68, and adders 72 and 74. Control loop 61 comprises process 62, controller 66, VHP prediction unit 70, and adders 76 and 78. Also included in control system 60 is loop interaction compensator 80, which provides additional compensation in loop 63 based on the error in loop 61, and loop interaction compensator 82, which provides additional compensation in loop 61 based on the error in loop 63. Each VHP prediction unit comprises a process model, uncorrected prediction vector unit, prediction correction unit, corrected prediction vector unit, horizon selection unit, and adder, such as process model 48, uncorrected prediction vector unit 49, prediction correction unit 50, corrected prediction vector unit 52, horizon selection unit 54, and adder 56 in FIG. 5. For simplicity, FIG. 6 depicts VHP prediction unit 68 configured to provide a prediction for a single time point at scan k+j and VHP prediction unit 70 configured to provide a prediction for a single time point at scan k+i. However, VHP prediction units 68 and 70 may also be configured to provide prediction vectors which are subtracted from set point vectors to form error vectors that may be formed into scalars by computing weighted averages, as discussed above with reference to FIG. 5.

In FIG. 6, each VHP prediction unit is configured to receive the control signals $u2_k$ and $u1_k$ from controllers 64 and 66, respectively, and disturbance signal $d_k$, which represents a measurable disturbance. The process model of each VHP prediction unit contains at least three step responses of the process, with a first step response representing the response of the output that is being predicted by the VHP prediction unit for a unit step signal applied to the first process input, a second step response representing the response of the output that is being predicted by the VHP prediction unit for a unit step signal applied to the second process input. In FIG. 5, process model 48 is shown receiving the control signal $u_k$ and the disturbance signal $d_k$. Accordingly, the VHP prediction unit shown in FIG. 5 may be used in control system 60 of FIG. 4 by configuring the disturbance signal input of the process model to receive the control signal provided by the second controller. Alternately, the VHP prediction units may be provided with an additional input and step response vector, and the equation given above for updating the prediction is modified as follows:

$$\bar{Y}_k^* = M\bar{Y}_{k-1} + A1\delta u1_{k-1} + A2\delta u2_{k-1} D\delta d_{k-1}$$

where $$\delta u1_{k-1} = u1_{k-1} - u1_{k-2}$$

and is the change in the first control input of the process at scan k−1, $$\delta u2_{k-1} = u2_{k-1} - u2_{k-2},$$

and is the change in the second control input of the process at scan k−1, $$\delta d_{k-1} = d_{k-1} - d_{k-2},$$

and is the observed change in the disturbance signal at scan k−1, and A1 and A2 are vectors storing step response coefficients measured at the output with respect to the first and second process inputs, respectively, and D is a vector storing step response coefficients measured at the output with respect to a disturbance.

In FIG. 6, VHP prediction unit 68 receives control signals $u2_k$ and $u1_k$ from controllers 64 and 66, respectively, and disturbance signal $d_k$ and provides a prediction signal $\bar{y}2_{k+j}$, which is a prediction of the output signal $y2_k$ at future scan k+j. Prediction signal $\bar{y}2_{k+j}$ is provided to adder 72, where it is subtracted from set point signal $SP_2$ to form error prediction signal $\bar{e}2_{k+j}$. Similarly, VHP 70 prediction unit receives control signals $u2_k$ and $u1_k$ from controllers 64 and 66, respectively, and disturbance signal $d_k$ and provides a prediction signal $\bar{y}1_{k+i}$, which is a prediction of the output signal $y1_k$ at future scan k+i. Prediction signal $\bar{y}1_{k+i}$ is provided to adder 78, where it is subtracted from set point signal $SP_1$ to form error prediction signal $\bar{e}1_{k+i}$.

Error prediction signal $\bar{e}1_{k+i}$ is also applied to loop interaction compensator 80 to form compensated error signal ($K_{21}\bar{e}1_{k+i}/K_{22}$), which in turn is applied to adder 74 where it is added to error prediction signal $\bar{e}2_{k+j}$ to form composite error prediction signal $\bar{e}2'_{k+j}$. Accordingly, composite error prediction signal $\bar{e}2'_{k+j}$ is equal to $(K_{21}/K_{22}) \bar{e}1_{k+i} + \bar{e}2_{k+j}$. When composite error signal $\bar{e}2'_{k+j}$ is applied to controller 64, the resulting change in the controller output signal is:

$$\delta u_2 = K_{22}((K_{21}/K_{22})\bar{e}1_{k+i} + \bar{e}2_{k+j}),$$

which is the equation that was derived above from the control matrix.

Likewise, error prediction signal $\bar{e}2_{k+j}$ is applied to loop interaction compensator 82 to form compensated error signal ($K_{12}\bar{e}2_{k+j}/K_{11}$), which in turn is applied to adder 76 where it is added to error prediction signal $\bar{e}1_{k+i}$ to form composite error prediction signal $\bar{e}1'_{k+i}$. Accordingly, composite error prediction signal $\bar{e}1'_{k+i}$ is equal to $(K_{12}/K_{11})\bar{e}2_{k+j} + \bar{e}1_{k+i}$. When composite error signal $\bar{e}1'_{k+i}$ is applied to controller 66, the resulting change in control action is:

$$\delta u_1 = K_{11}((K_{12}/K_{11})\bar{e}2_{k+j} + \bar{e}1_{k+i}),$$

which is also derived above from the control matrix.

In conclusion, multivariable predictive control of a 2×2 process is realized by coupling two VHP prediction units and two loop interaction compensators of the present invention to a pair of classic feedback controllers.

The VHP of the present invention may be coupled to a controller employing any control algorithm. However, it is contemplated that the VHP of the present invention will be particularly beneficial when used by control engineers to convert control loops having classic linear or nonlinear feedback controllers into predictive control loops, thereby compensating for dead time, time variant dynamics, and measured disturbances. Many companies have a large investment in distributed control systems having classic feedback controllers. In addition, control engineers are familiar with feedback controllers, and have extensive experience configuring and timing control loops controlled by feedback controllers. The VHP of the present invention preserves such investments and experience, while enhancing the quality of process control.

In a first mode of operation, the VHP of the present invention is configured to provide a prediction of the output of the controlled process at a future time based on the dead time of the process, thereby addressing the same problem as that addressed by the Smith Predictor algorithm. However, unlike the Smith Predictor, the VHP of the present invention is not limited to a first order plus dead time model, can easily incorporate the effects of measured disturbances into the prediction, and allows dynamic selection of prediction time.

In a second mode of operation, the VHP of the present invention is configured to provide a prediction vector of the controlled process that includes a number predictions at different scan times. In this mode, an error vector is computed by subtracting the prediction vector from a set point prediction vector. If the controller expects a single error signal, then the error vector can be converted into an error scalar by computing a weighted average, and the scalar error can be applied to the controller. Accordingly, in this mode of operation the VHP of the present invention converts a classic feedback control loop into a predictive control loop that computes controller actions based on a range of predictions, which tends to produce more stable and robust control.

Finally, both of these modes may be used in a multivariable control system, as shown in FIG. 6. Therefore, the VHP of the present invention provides multivariable processes with compensation for measured disturbances, dead time, time variant dynamics, as well as compensation for errors in neighboring loops.

Although the present invention has been described with reference to preferred embodiments, workers skilled in the art will recognize that changes may be made in form and detail without departing from the spirit and scope of the invention.

What is claimed is:

1. A variable horizon predictor (41) for use in a control loop (42) having a process under control (46) and a controller (44), wherein the controller (44) has a controller output for providing a control signal and a controller input for receiving an error signal, and the process (46) has a process input for controlling a process variable, with the process input coupled to the controller output to receive the control signal, and a process output for providing a process output signal representative of the process variable, the variable horizon predictor comprising:

a process model (48) having a model input coupled to the controller output to receive the control signal and a model response output for providing a model response signal based on the control signal;

a prediction vector unit (51) having a prediction vector output for providing a prediction vector and a model response input coupled to the model response output of the process model (48) to receive the model response signal, wherein the prediction vector comprises predicted future values of the process output signal;

a horizon selection unit (54) having a prediction subvector output for providing a selected subvector of the prediction vector and prediction vector input coupled to the prediction vector output of the prediction vector unit to receive the prediction vector, wherein the horizon selection units selects a prediction subvector from the prediction vector; and an error scalar/vector calculator (58) having an error signal output coupled to the controller input and a subvector input coupled to the subvector output of the horizon selection unit to receive the subvector, wherein the error vector calculator produces an error signal based on a set point signal and the prediction subvector.

2. The variable horizon predictor (41) of claim 1 wherein the process model (48) includes a disturbance input for receiving a disturbance signal representing a disturbance to process (46) and the model response signal is based also on the disturbance signal.

3. The variable horizon predictor (41) of claim 1 wherein prediction vector unit (51) comprises:

an uncorrected prediction vector unit (49) for receiving the model response from the model response output to form an uncorrected prediction vector based on the model response signal and a prior corrected prediction vector, and providing an uncorrected prediction vector at an uncorrected prediction vector output;

a prediction correction unit (50) for receiving the uncorrected prediction vector at an uncorrected prediction vector input, correcting the uncorrected prediction vector based on the process output signal, and providing a corrected prediction vector at a corrected prediction vector output; and a corrected prediction vector unit (52) for receiving the corrected prediction vector at a corrected prediction vector input, updating the prior corrected prediction vector stored in the uncorrected prediction vector unit (49) with the corrected prediction vector, and providing the prediction vector at the prediction vector output, wherein the prediction vector is the corrected prediction vector.

4. The variable horizon predictor (41) of claim 3 wherein the prediction correction unit (50) has a prediction error input, and the prediction vector unit (51) further comprises:

an adder (56) having a first input that receives the process output signal, a second input that receives an uncorrected prediction from the uncorrected prediction vector corresponding in time with the process output signal, and an output that provides a prediction error signal representing a difference between the process output signal and the uncorrected prediction, with the prediction error signal coupled to the prediction error input of the prediction correction unit (50).

5. The variable horizon predictor (41) of claim 4 wherein the prediction correction unit (50) adds the prediction error signal to predicted future values stored in the uncorrected prediction vector to form the corrected prediction vector.

6. The variable horizon predictor (41) of claim 1 wherein the error signal provided by the error scalar/vector calculator (58) comprises an error vector, and the variable horizon predictor (41) further comprises:

a set point unit (59) having a set point output that provides the set point signal to the error scalar/vector calculator (58) as a set point vector, wherein the prediction subvector, the set point vector, and the error vector each store an equivalent number of predicted values, and the error scalar/vector calculator (58) forms the error vector by calculating differences between corresponding predicted values stored in the prediction subvector and the set point vector.

7. The variable horizon predictor (41) of claim 1 wherein the error signal provided by the error scalar/vector calculator (58) comprises a single scalar value, and the variable horizon predictor (41) further comprises:

a set point unit (59) having a set point output that provides the set point signal to the error scalar/vector calculator (58) as a set point vector, wherein the prediction subvector and the set point vector each store an equivalent number of predicted values, and the error scalar/vector calculator (58) forms the single scalar value by calculating a weighted average of the differences between corresponding predicted values stored in the prediction subvector and the set point vector.

8. A method of controlling a process using a predictive feedback control system through forming an input signal, based on predicted future process parameter output signal values, that is provided to an input of a controller usable for controlling a process in a nonpredictive feedback control system by receiving command and process parameter signals as a basis for providing an output signal to operate a process control actuator used in that nonpredictive system but incapable of providing such an output signal in that nonpredictive system based on predicted future process parameter output signal values, the method comprising:

providing a process model of the process to be controlled with the process model also receiving at an input thereof the controller output signal used to operate an actuator for altering the process;

providing at an output of said process model a process model current response vector corresponding to input signals provided at inputs of said process model;

forming a current prediction vector based on both the controller output signal and the corresponding process model current response vector, the current prediction vector having a plurality of ordered elements that store current predictions of a value of a process parameter output signal;

providing a corrected prediction vector based on said current prediction vector and on prediction errors, the corrected prediction vector having a plurality of ordered elements that store corrected predictions of values of process parameter output signal; and providing an input signal to the controller by determining an error signal as said controller input signal based on the corrected prediction vector and a set point vector having a plurality of elements that store projections of a set point signal.

9. The method of claim 8 wherein determining the error signal based on the corrected prediction vector comprises subtracting each element of the corrected prediction vector from a corresponding element of the set point vector to form an error vector that provides a basis for the error signal.

10. The method of claim 8 wherein determining the error signal based on the corrected prediction vector comprises:

subtracting each element of the corrected prediction vector from a corresponding element of the set point vector to form an error vector; and multiplying each element of the error vector by a corresponding weighting factor to form a plurality of weighted error elements, and summing the weighted error elements to form an error scalar that provides a basis for the error signal.

11. The method of claim 8 further comprising setting elements of the current prediction vector to initial values based on the current process parameter output signal.

12. The method of claim 8 wherein the process model comprises an input step response vector having elements that represent a response of the process parameter output signal to a unit step signal applied at an input of an actuator used with the process, and forming a process model current response vector comprises:

detecting a current change in the controller output signal; and multiplying elements of the input step response vector by the value of the current change in the controller output signal to form the process model current response vector.

13. The method of 8 wherein the plurality of elements of the corrected prediction vector includes a first element, and updating the current prediction vector comprises:

shifting each element stored in the previous corrected prediction vector by one element position away from the first element; and adding the process model current response vector to the shifted previous corrected prediction vector.

14. The method of claim 8 wherein correcting the current prediction vector to form the corrected prediction vector comprises:

determining the prediction errors as an output difference between a real magnitude of the process parameter output signal and a corresponding predicted magnitude of the process parameter output signal; and adjusting elements of the current prediction vector based on the output difference to form the corrected prediction vector.

15. The method of claim 14 wherein the adjusting of elements of the current prediction vector comprises:

calculating a filtered output difference based on the output difference and previous output differences; and adding the corresponding filtered output difference to each element of the current prediction vector.

16. The method of claim 14 wherein the adjusting of elements of the current prediction vector comprises adding the corresponding output difference to each element of the current prediction vector.

17. The method of claim 8 wherein determining the error signal based on the corrected prediction vector comprises:

selecting a prediction subvector from the corrected prediction vector; and determining the error signal based on the prediction subvector and the set point vector.

18. The method of claim 17 wherein selecting a prediction subvector comprises selecting a prediction subvector from the corrected prediction vector based on a dead time characteristic of the process.

19. The method of claim 8 wherein forming a process model to also receive at an input thereof the controller output signal further comprises:

receiving also at another input thereof a representation of a disturbance signal occurring in the process; and providing a corresponding process model current response vector.

20. The method of claim 19 wherein the process model comprises an input step response vector having elements that represent a response of the process parameter output signal to a unit step signal applied at the input of an actuator used with the process and a disturbance step response vector having elements that represent a response of the process parameter output signal to a unit step disturbance occurring to the process, and forming a process model current response vector comprises:

detecting a current change in the controller output signal;

multiplying elements of the input step response vector by the value of the current change in the controller output signal to form an input change vector;

detecting a current disturbance change;

multiplying elements of the disturbance step response vector by the value of the current disturbance change to form a disturbance change vector; and adding the input change vector to the disturbance change vector to form the process model current response vector.

21. A method of forming a composite error signal that is provided to a first controller input of a first feedback controller, wherein the first feedback controller supplies a first control signal to a first process input of a process, with the first control signal affecting a first process output signal and a second process output signal of the process, and a second feedback controller supplies a second control signal to a second process input of the process, with the second control signal also affecting the first process output signal and the second process output signal of the process, the method comprising:

signal also affecting the first process output signal and the second process output signal of the process, the method comprising:

forming a first prediction vector based on the first and second control signals, the first prediction vector having a plurality of elements that store predictions of the first process output signal;

forming a second prediction vector based on the first and second control signals, the second prediction vector having a plurality of elements that store predictions of the second process output signal;

calculating a first error vector based on the first prediction vector and a first set point vector;

calculating a second error vector based on the second prediction vector and a second set point vector;

multiplying each element of the second prediction vector by a scaling factor to produce a second scaled error vector;

adding elements of the first error vector to corresponding elements of the second scaled error vector to form a composite error vector; and forming the composite error signal from the composite error vector.

22. The method of claim 21 wherein forming the composite error signal from the composite error vector comprises computing a weighted average of all elements of the composite error vector.

23. The method of claim 21 wherein the first prediction vector and the second prediction vector are each also based on a disturbance signal that represents a disturbance to the process.

24. An apparatus for controlling a process (62) having p process inputs and q process outputs, wherein $p \geq 2$ and $q \geq 2$, in cooperation with p feedback controllers (64 and 66), with each feedback controller having an error input and a controller output that provides a control signal to one of the p process inputs such that each of the p process inputs is coupled to a controller output, wherein q set point signals are provided that correspond to and represent a desired output for each of the q process outputs, the apparatus comprising:

q prediction units (68 and 70), each prediction unit having p prediction inputs and a prediction output for providing a prediction output signal representing a predicted future value of a process output such that each of the q process outputs is predicted, with each prediction input coupled to a unique controller output;

q set point error adders (72 and 78), each set point adder having a first input coupled to a prediction output of a prediction unit, a second input configured to receive a set point signal corresponding to the process output predicted by the prediction unit, and an output that provides an error signal representative of a difference between the prediction output signal and the set point signal;

p×(q−1) loop interaction compensators (80 and 82), each loop interaction compensator having an input for receiving an error signal and an output for providing a scaled error signal; and p composite error adders (74 and 76), each composite error adder having a first input configured to receive a unique error signal, q-1 interaction inputs, with each interaction input configured to receive a unique scaled error signal, and a composite error output coupled to a controller input, for providing a composite error signal to each controller input.

25. The apparatus of claim 24 wherein each prediction unit (68 and 70) includes an input coupled to the process output corresponding to the process output signal predicted by the prediction unit, and the prediction unit corrects the prediction output signal based on the process output signal.

26. The apparatus of claim 24 wherein each prediction unit (68 and 70) includes a disturbance input for receiving a disturbance signal representing a disturbance to the process (62), and the prediction output signals of each prediction unit (68 and 70) are based on the control signals and the disturbance signal.

27. A method of forming a composite error signal that is provided to a first controller input of a first feedback controller, wherein the first feedback controller supplies a first control signal to a first process input of a process, with the first control signal affecting a first process output signal and a second process output signal of the process, and a second feedback controller supplies a second control signal to a second process input of the process, with the second control signal also affecting the first process output signal and the second process output signal of the process, the method comprising:

forming a first prediction based on the first and second control signals, the first prediction representative of a future value of the first process output signal;

forming a second prediction based on the first and second control signals, the second prediction representative of a future value of the second process output signal;

calculating a first error signal based on the first prediction and a first set point signal;

calculating a second error signal based on the second prediction and a second set point signal;

multiplying the second error signal by a scaling factor to form a second scaled error signal; and adding the second scaled error signal to the first error signal to produce the composite error signal.

28. The method of claim 27 wherein the first prediction and the second prediction are each also based on a disturbance signal that represents a disturbance to the process.

* * * * *

UNITED STATES PATENT AND TRADEMARK OFFICE
CERTIFICATE OF CORRECTION

PATENT NO. : 5,568,378  PART I OF II
DATED : OCTOBER 22, 1996
INVENTOR(S) : WILHELM K. WOJSZNIS

It is certified that error appears in the above-indentified patent and that said Letters Patent is hereby corrected as shown below:

Col. 7, line 17, delete "$\delta d_{k-1} = k_{k-1} - k_{k-2}$", insert --$\delta d_{k-1} = d_{k-1} - d_{k-2}$ Col. 7, line 42, delete "$\bar{Y}_k = \bar{Y}_k^* + F_{(y_R - \bar{y}_R)}$", insert --$\bar{Y}_k = \bar{Y}_k^* + F(y_k - \bar{y}_k)$--

Col. 8, line 46, delete "$\Gamma^u = \text{diag}[\Gamma^u_1, \ldots, \Gamma^u_p]$", insert --$\Gamma^y = \text{diag}[\Gamma^y_1, \ldots, \Gamma^y_p]$--

Col. 8, line 64, delete "$A^T \Gamma^{yT} \Gamma^u \bar{E}_k$", insert --$A^T \Gamma^{yT} \Gamma^y \bar{E}_k$--

Col. 9, line 67, delete "$\delta u_1 = K_{11}(\bar{e}1_{k+i} + (K_{12}/K_{11})\text{fheight}\bar{e}2_{k+j})$, and insert --$\delta u_1 = K_{11}(\bar{e}1_{k+i} + (K_{12}/K_{11})\bar{e}2_{k+j})$,--

Col. 10, line 3, delete "$\delta u_2 = K_{22}((K_{21}/K_{22})\text{fheight}\bar{e}1_{k+i}\bar{e}2_{k+j}) + \bar{e}2k+j)$.", insert --$\delta u_2 = K_{22}((K_{21}/K_{22})\bar{e}1_{k+i}) + \bar{e}2_{k+j})$.--

Col. 10, line 49, after "Fig.", delete "4", insert --6--

UNITED STATES PATENT AND TRADEMARK OFFICE
CERTIFICATE OF CORRECTION

PATENT NO. : 5,568,378    PART II OF II
DATED : OCTOBER 22, 1996
INVENTOR(S) : WILHELM K. WOJSZNIS

It is certified that error appears in the above-indentified patent and that said Letters Patent is hereby corrected as shown below:

Col. 10 line 56, delete "$\bar{Y}_k^* = M\bar{Y}_{k-1} + A1\delta u1_{k-1} + A2\delta u2_{k-1} D\delta d_{k-1}$", insert --$\bar{Y}_k^* = M\bar{Y}_{k-1} + A1\delta u1_{k-1} + A2\delta u2_{k-1} + D\delta d_{k-1}$,--

Col. 11, line 61, after "and", delete "timing", insert --tuning--

Col. 13, line 6, after the first "response", insert --signal--

Col. 14, line 29, after "output", delete "signal", insert --signals--

Signed and Sealed this

Twenty-seventh Day of May, 1997

Attest:

BRUCE LEHMAN

Attesting Officer    Commissioner of Patents and Trademarks